United States Patent
Boates et al.

(10) Patent No.: US 12,131,376 B2
(45) Date of Patent: Oct. 29, 2024

(54) PAYMENT PROCESSOR FINANCING OF CUSTOMER PURCHASES

(71) Applicant: BLOCK, INC., Oakland, CA (US)

(72) Inventors: Brian Boates, Oakland, CA (US); Adam Jeremy Fern, Oakland, CA (US); Andrew Kimball, Oakland, CA (US); John Bryan Scott, Oakland, CA (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/838,690

(22) Filed: Jun. 13, 2022

(65) Prior Publication Data

US 2022/0301052 A1    Sep. 22, 2022

Related U.S. Application Data

(63) Continuation of application No. 17/000,650, filed on Aug. 24, 2020, now Pat. No. 11,720,959, which is a
(Continued)

(51) Int. Cl.
*G06Q 40/03* (2023.01)
*G06Q 20/02* (2012.01)
(Continued)

(52) U.S. Cl.
CPC ............ *G06Q 40/03* (2023.01); *G06Q 20/02* (2013.01); *G06Q 20/08* (2013.01); *G06Q 20/20* (2013.01);
(Continued)

(58) Field of Classification Search
CPC ...... G06Q 40/025; G06Q 20/02; G06Q 20/08; G06Q 20/20; G06Q 20/204; G06Q 20/322; G06Q 20/405
See application file for complete search history.

(56) References Cited

U.S. PATENT DOCUMENTS

| 6,167,385 A | 12/2000 | Hartley-Urquhart |
| 6,941,281 B1 | 9/2005 | Johnson |

(Continued)

FOREIGN PATENT DOCUMENTS

| CA | 2295613 A1 * | 1/1999 |
| CA | 3021034 A1 | 10/2016 |
| WO | 2012150985 A1 | 11/2012 |

OTHER PUBLICATIONS

Non-Final Office Action mailed on Aug. 27, 2015, for U.S. Appl. No. 14/675,127, of Shearer, D.J., et al., filed Mar. 31, 2015.
(Continued)

*Primary Examiner* — Allen C Chein
(74) *Attorney, Agent, or Firm* — Polsinelli P.C.

(57) ABSTRACT

In some examples, a computing device of a service provider receives, via a user interface of a merchant and in association with a transaction between a customer and the merchant, a request to finance the transaction. The service provider determines, based at least on information about the transaction and/or historical transaction data of the customer, that the customer is eligible for receiving financing for the transaction. The service provider customizes an offer for the user for an amount to be financed, a payment plan for repayment of the amount over two or more installments, and a fee to be paid to the service provider. In response to receiving an indication that the customer accepts the offer via an interaction with a user interface of the customer, transferring funds from the financing service provider to the merchant prior to the customer having paid the two or more installments.

20 Claims, 6 Drawing Sheets

Related U.S. Application Data continuation of application No. 15/798,868, filed on Oct. 31, 2017, now Pat. No. 10,755,349, which is a continuation of application No. 14/616,515, filed on Feb. 6, 2015, now Pat. No. 9,824,394.

(51) Int. Cl.
  *G06Q 20/08* (2012.01)
  *G06Q 20/20* (2012.01)
  *G06Q 20/32* (2012.01)
  *G06Q 20/40* (2012.01)

(52) U.S. Cl.
  CPC ......... *G06Q 20/204* (2013.01); *G06Q 20/322* (2013.01); *G06Q 20/405* (2013.01)

(56) References Cited

U.S. PATENT DOCUMENTS

| | | | |
|---|---|---|---|
| 7,353,203 B1 | 4/2008 | Kriplani et al. | |
| 8,290,864 B2 | 10/2012 | Raz et al. | |
| 8,706,624 B2 | 4/2014 | Don et al. | |
| 9,779,432 B1 | 10/2017 | Shearer et al. | |
| 9,824,394 B1 | 11/2017 | Boates et al. | |
| 9,892,458 B1 | 2/2018 | Shearer et al. | |
| 10,387,882 B2 | 8/2019 | Hagen et al. | |
| 10,607,199 B2 | 3/2020 | Cassel et al. | |
| 10,686,781 B1 | 6/2020 | Kaditz et al. | |
| 10,755,349 B1 | 8/2020 | Boates et al. | |
| 10,872,362 B1 | 12/2020 | Shearer et al. | |
| 2002/0038277 A1 | 3/2002 | Yuan | |
| 2004/0064398 A1 | 4/2004 | Browne et al. | |
| 2005/0283436 A1* | 12/2005 | Greer | G06Q 40/025 |
| | | | 705/40 |
| 2007/0174191 A1 | 7/2007 | Keaton et al. | |
| 2007/0255653 A1 | 11/2007 | Tumminaro et al. | |
| 2008/0052229 A1 | 2/2008 | Sheinker et al. | |
| 2008/0109348 A1 | 5/2008 | Saxena et al. | |
| 2008/0154769 A1 | 6/2008 | Anderson et al. | |
| 2008/0195534 A1 | 8/2008 | Andis et al. | |
| 2009/0112744 A1* | 4/2009 | Park | G06Q 30/00 |
| | | | 705/34 |
| 2009/0164363 A1 | 6/2009 | Ahlers et al. | |
| 2010/0268667 A1 | 10/2010 | King et al. | |
| 2011/0055080 A1 | 3/2011 | Ahlers et al. | |
| 2012/0011071 A1 | 1/2012 | Pennock et al. | |
| 2012/0239552 A1* | 9/2012 | Harycki | G06Q 40/02 |
| | | | 705/38 |
| 2013/0054484 A1 | 2/2013 | Hoeflinger et al. | |
| 2013/0204664 A1 | 8/2013 | Romagnolo et al. | |
| 2013/0226688 A1 | 8/2013 | Harvilicz et al. | |
| 2014/0032298 A1 | 1/2014 | Corrie et al. | |
| 2014/0032307 A1 | 1/2014 | Corrie et al. | |
| 2014/0032308 A1 | 1/2014 | Corrie et al. | |
| 2014/0032309 A1 | 1/2014 | Corrie et al. | |
| 2014/0032310 A1 | 1/2014 | Corrie et al. | |
| 2014/0058804 A1 | 2/2014 | Zhou et al. | |
| 2014/0143120 A1 | 5/2014 | Clarke et al. | |
| 2014/0156433 A1* | 6/2014 | Hills | G06Q 20/4037 |
| | | | 705/21 |
| 2014/0164049 A1 | 6/2014 | Yakos et al. | |
| 2014/0164217 A1 | 6/2014 | Hammock et al. | |
| 2014/0171039 A1 | 6/2014 | Bjontegard | |
| 2014/0244486 A1 | 8/2014 | Abril | |
| 2014/0258094 A1 | 9/2014 | Jouhikainen et al. | |
| 2014/0279682 A1 | 9/2014 | Feldman | |
| 2014/0304137 A1 | 10/2014 | Olson et al. | |
| 2014/0316823 A1 | 10/2014 | Cooper | |
| 2014/0351116 A1 | 11/2014 | Hoff | |
| 2014/0358766 A1* | 12/2014 | Nayyar | G06Q 40/025 |
| | | | 705/38 |
| 2015/0026035 A1* | 1/2015 | Showalter | G06Q 40/03 |
| | | | 705/38 |
| 2015/0032598 A1* | 1/2015 | Fleming | G06Q 40/03 |
| | | | 705/38 |
| 2015/0039490 A1 | 2/2015 | Forrester et al. | |
| 2015/0088727 A1 | 3/2015 | Goldblatt | |
| 2015/0095210 A1 | 4/2015 | Grech et al. | |
| 2015/0100475 A1 | 4/2015 | Cummings et al. | |
| 2015/0168478 A1 | 6/2015 | Öhlen et al. | |
| 2015/0278946 A1 | 10/2015 | Don et al. | |
| 2015/0278947 A1 | 10/2015 | Don et al. | |
| 2015/0278948 A1 | 10/2015 | Don et al. | |
| 2015/0278949 A1 | 10/2015 | Don et al. | |
| 2015/0332414 A1 | 11/2015 | Unser et al. | |
| 2016/0110671 A1 | 4/2016 | Ghosh et al. | |
| 2016/0166689 A1 | 6/2016 | Adler et al. | |
| 2016/0203551 A1 | 7/2016 | Tutte et al. | |
| 2016/0225074 A1 | 8/2016 | Xiao et al. | |
| 2020/0160369 A1 | 5/2020 | Youakim et al. | |
| 2021/0012313 A1 | 1/2021 | Don et al. | |
| 2021/0012343 A1 | 1/2021 | Theodoro et al. | |

OTHER PUBLICATIONS

Non-Final Office Action mailed on Jan. 21, 2016, for U.S. Appl. No. 14/675,257, of Shearer, D.J., et al., filed Mar. 31, 2015.
Final Office Action mailed on Mar. 31, 2016, for U.S. Appl. No. 14/675,127, of Shearer, D.J., et al., filed Mar. 31, 2015.
Non-Final Office Action mailed on Apr. 27, 2016, for U.S. Appl. No. 14/616,515, of Boates, B., et al., filed Feb. 6, 2015.
Final Office Action mailed Oct. 7, 2016, for U.S. Appl. No. 14/675,257, of Shearer, D.J., et al., filed Mar. 31, 2015.
Non-Final Office Action mailed Nov. 3, 2016, for U.S. Appl. No. 14/675,127, of Shearer, D.J., et al., filed Mar. 31, 2015.
Final Rejection mailed Feb. 17, 2017, for U.S. Appl. No. 14/616,515, of Boates, B., et al., filed Feb. 6, 2015.
Non-Final Office Action mailed Mar. 1, 2017, for U.S. Appl. No. 14/616,520, of Boates, B., et al., filed Feb. 6, 2015.
Final Office Action mailed Apr. 10, 2017, for U.S. Appl. No. 14/675,127, of Shearer, D.J., et al., filed Mar. 31, 2015.
Notice of Allowance mailed May 31, 2017, for U.S. Appl. No. 14/675,257, of Shearer, D.J., et al., filed Mar. 31, 2015.
Notice of Allowance mailed Jul. 24, 2017, for U.S. Appl. No. 14/616,515, of Boates, B., et al., filed Feb. 6, 2015.
Final Office Action mailed Sep. 13, 2017, for U.S. Appl. No. 14/616,520, of Boates, B., et al., filed Feb. 6, 2015.
Notice of Allowance mailed Sep. 20, 2017, for U.S. Appl. No. 14/675,127, of Shearer, D.J., et al., filed Mar. 31, 2015.
Non-Final Office Action mailed Jul. 16, 2019, for U.S. Appl. No. 15/722,003, of Shearer, D.J., et al., filed Oct. 2, 2017.
Non-Final Office Action mailed Oct. 4, 2019, for U.S. Appl. No. 15/798,868, of Boates, B., et al., filed Oct. 31, 2017.
Final Office Action mailed Feb. 6, 2020, for U.S. Appl. No. 15/722,003, of Shearer, D.J., et al., filed Oct. 2, 2017.
Notice of Allowance mailed Apr. 22, 2020, for U.S. Appl. No. 15/798,868, of Boates, B., et al., filed Oct. 31, 2017.
Notice of Allowance mailed May 20, 2020, for U.S. Appl. No. 15/722,003, of Shearer, D.J., et al., filed Oct. 2, 2017.
Notice of Allowance mailed Aug. 18, 2020, for U.S. Appl. No. 15/722,003, of Shearer, D.J., et al., filed Oct. 2, 2017.
Non-Final Office Action mailed Feb. 3, 2021, for U.S. Appl. No. 17/000,650, of Boates, B., et al., filed Aug. 24, 2020.
Final Office Action mailed Aug. 9, 2021, for U.S. Appl. No. 17/000,650, of Boates, B., et al., filed Aug. 24, 2020.
Advisory Action mailed Nov. 10, 2021, for U.S. Appl. No. 17/000,650, of Boates, B., et al., filed Aug. 24, 2020.
Non-Final Office Action mailed Apr. 5, 2022, for U.S. Appl. No. 17/000,650, of Boates, B., et al., filed Aug. 24, 2020.

* cited by examiner

PAYMENT PROCESSOR FINANCING OF CUSTOMER PURCHASES

CROSS-REFERENCES TO RELATED APPLICATIONS

This application is a continuation of, and claims priority to, U.S. patent application Ser. No. 17/000,650, filed Aug. 24, 2020, which is a continuation of, and claims priority to, U.S. patent application Ser. No. 15/798,868, filed Oct. 31, 2017, issued as U.S. Pat. No. 10,755,349, which is a continuation of, and claims priority to, U.S. patent application Ser. No. 14/616,515, filed Feb. 6, 2015, issued as U.S. Pat. No. 9,824,394, all of which are incorporated by reference herein.

BACKGROUND

Offering financing plans to customers is shown to provide businesses with benefits such as repeat business, brand awareness, customer loyalty, etc. Individuals can approach a business, e.g., consumer electronics store, to request a financing plan for a purchase of a product or service. When requesting for a financing plan, an individual will typically fill out an application that provides the business with the individual's personal and financial information. The business will then evaluate the individual's application to make a decision on whether to approve the financing plan, e.g., a flexible monthly payment plan for the purchase. However, the business generally does not get paid in full for the purchase at the time of transaction. In addition, the individual could become unable to pay after being approved for the financing plan by the business.

BRIEF DESCRIPTION OF THE DRAWINGS

The techniques described herein are illustrated by way of example, and not by way of limitation, in the figures of the accompanying drawings, in which like reference numerals are used to refer to similar elements.

The figures depict various embodiments of the techniques described herein for purposes of illustration only. It should be readily recognized from the following discussion that alternative embodiments of the structures and methods illustrated herein may be employed without departing from the principles of the techniques described herein.

DETAILED DESCRIPTION

Various embodiments of the disclosure are discussed in detail below. While specific implementations are discussed, it should be understood that this is done for illustration purposes only. It will be recognized that other components and configurations may be used without parting from the spirit and scope of the techniques disclosed herein.

Systems and methods in accordance with various embodiments of the techniques disclosed herein overcome one or more of the above-referenced and other deficiencies in conventional approaches to providing financing to buyers for purchasing a product or service from a merchant. It will be recognized, that the techniques discussed herein can apply to various financing methods, such as cash advances and loans, although one or the other may be used for descriptive purposes in the examples below. The techniques disclosed herein, whether discussed in the examples as cash advance techniques or loan techniques, can be practiced with equal applicability as a cash advance or loan. In particular, various embodiments of the techniques can provide a method for receiving a request for financing a purchase by a buyer, evaluating financial transactions conducted by the buyer through a payment system and, based on the evaluation, providing the buyer with one or more offers of financing for purchasing a product. The determination of whether a buyer qualifies for a financing offer can be based on a credit check and/or entirely on an evaluation of the buyer's previously conducted financial transactions through a payment processing system. In other embodiments, the buyer need not complete applications for requesting the financing or provide a credit check. For example, over the previous year, the buyer may have conducted financial transactions through the payment processing system that total $50,000 in payment volume. Based on this payment volume and various other factors associated with the buyer, a determination can be made to offer the buyer a financing plan for purchasing say, a television. The financing plan may include a payment to a merchant of $5,000 and a $500 fee for the payment being offered for purchasing the television.

A user interface at a point-of-sale (POS) terminal can be used to present the financing offer to the buyer and receive an acceptance of the financing offer from the buyer (e.g., through a touch screen interface). Once the offer is accepted by the buyer, the merchant can be paid in full for the purchase through an electronic deposit made by the payment processing system to a financial account of the merchant. Thus, in the example above, the merchant selling the television to the buyer is paid $5,000 in full at the time of purchase and the buyer pays back to the payment processing system a total amount of $5,500 (i.e., the $5,000 payment to the merchant and the $500 fee). In one example, the total amount can be collected by the payment processing system as a number of level payments charged to the credit card, or other payment instrument, of the buyer. In another example, the total amount can be collected by the payment processing system as an additional charge to the buyer during future financial transactions conducted through the payment processing system.

In one embodiment, if the buyer also uses the payment processing system to process payments as a merchant, repayment of the financing amount can be withheld from transactions where the buyer is acting as a merchant. For example, each time the buyer (acting as a merchant, e.g., accepting payment for goods or services provided to other buyers) conducts a financial transaction through the payment processing system, the payment processing system will withhold a specified portion, e.g., 10 percent, from the amount charged in the financial transaction for repayment of the financing amount. For example, if the buyer, again acting as a merchant, receives $50.00 in a financial transaction processed by the payment processing system, then, while processing the financial transaction, the payment processing system will withhold $5.00 and apply that amount to the balance owed by the buyer. In this example, at a rate of 10 percent, the buyer will be done repaying the amount owed once the buyer has reached $55,000 in financial transactions conducted through the payment processing system. In some embodiments, the payment system can be configured to deduct the rate of repayment, e.g., 10 percent, from a group of financial transactions conducted by the buyer through the payment system over a particular period of time, e.g., daily, weekly, bi-weekly, monthly, or yearly.

Figure 1:
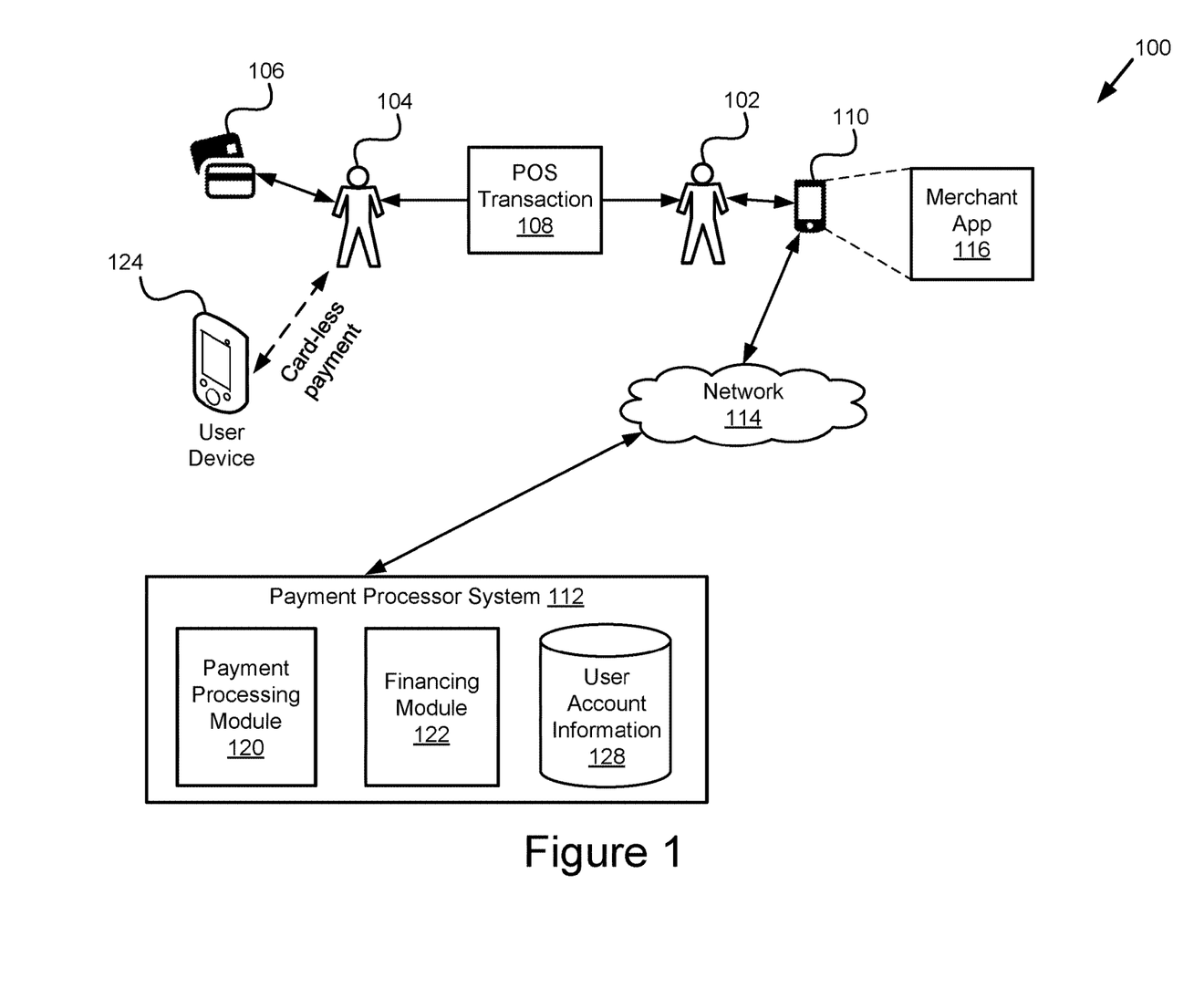
FIG. 1 illustrates an example architecture of a customer financing system for financing a purchase made by buyers.

FIG. 1 illustrates an example architecture of a customer financing system 100 for financing a purchase made by buyers. In the example of FIG. 1, a buyer 104 may use any of a variety of payment cards 106 when participating in a point-of-sale (POS) transaction with the merchant 102. In some embodiments, the payment cards 106 may include one or more magnetic stripes for providing payment card and buyer information when swiped in a card reader. For example, credit cards, debit cards, gift cards, etc. In other embodiments, other types of payment cards or methods may be used, for example a user device 124 (e.g., a mobile phone, PDA, tablet computer, or the like) of the buyer 104 including a near field communication chip (i.e., card-less payment transaction), smart cards having a built in integrated circuit including a memory chip or a radio frequency identification tag, and the like.

The customer financing system 100 in the example of FIG. 1 illustrates a merchant device 110 associated with the merchant 102 that participates in the payment processing and financing service provided by a service provider. The merchant device 110, as discussed elsewhere herein, may be any appropriate computing device configured to allow the merchant 102 to send and receive requests, messages, voice calls or other types of information to access the payment processing system 112 over the network 114. In some embodiments the merchant device 110 may be a mobile computing device such as a smartphone or a tablet. In some embodiments, the merchant device 110 may be a desktop computer, a laptop computer, a netbook, or other computing device. In other embodiments, the merchant device 110 could be any device with a cellular connection and a communication port, such as an audio input/output port.

In some embodiments, the merchant device 110 may include an instance of a merchant application 116 executed on the merchant device 110. The merchant application 116 may provide POS functionality to enable the merchant 102 to accept payments at a POS location using the merchant device 110. The merchant application 116 running on the merchant device 110 may send transaction information via network 114 (e.g., the internet) to the payment processing system 112, e.g., as the transaction is being conducted at the POS location. As further explained in reference to FIG. 4, the transaction information may include information regarding the time, place, and the amount of each respective transaction, information related to the item acquired, payment card information, as well as additional information, such as buyer information. In some embodiments, the merchant application 116 may send a request to the payment processing system 112 for obtaining financing for an item purchased by the buyer.

In other embodiments, the merchant device 110 may include an internet browser, or the like. The merchant application 116 and/or the internet browser provide the merchant 102 access to a merchant dashboard and/or merchant support site provided by the operator of the payment processing system 112. The merchant dashboard displays merchant account activity and gives merchants tools to manage merchant accounts and customer accounts. For example, the merchant dashboard allows a merchant to review sales and other reports, create items and pricing, set up employee accounts, customer accounts, review customer feedback, adjust account settings, etc. The merchant support site provides detailed support articles for various questions and issues that a merchant may encounter while operating a merchant device or using a merchant account.

The payment processing system 112 enables a service provider to provide a payment service in which merchants 102 are able to conduct POS transactions with a plurality of buyers 104, such as for selling services and/or products to the buyers 104. The payment processing system 112 includes a payment processing module 120, financing module 122, and user account information 128. The payment processing system 112 and its components are described in further detail in reference to FIGS. 4 and 5.

The payment processing module 120 includes software and/or logic for processing payments made through the merchant application 116 of the merchant device 110. For example, the payment processing module 120 may receive transaction information, including payment card information of the buyer 104, from the merchant device 110 and verify that the payment card 106 can be used to pay for the transaction, such as by contacting a card clearinghouse of a payment card network. To accept electronic payments for POS transactions, the merchant 102 may create a merchant account on the payment processing system 112 by providing information describing the merchant 102, including, for example, merchant name, contact information (e.g., telephone numbers, the merchant's address), one or more financial accounts to which funds will be deposited, and such. In another example, the buyer 104 may also have a merchant account with the payment processing system and accept payment in POS transactions with other buyers.

In some embodiments, the payment processing module 120 receives a request through the merchant application 116 of the merchant 102 for financing a purchase made by the buyer 104. For example, the payment processing module 120 may receive a request from a merchant 102 who sells home furnishings to provide financing for a buyer 104 purchasing a dining table. As part of offering a financing plan, the merchant may create a customer account on the payment processing system 112 by providing information describing the buyer 104, including, for example, buyer name, item purchased, contact information (e.g., telephone number, buyer's address) credit card and/or bank account information for debiting payment toward fulfilling a debt owed, and such.

The financing module 122 includes software and/or logic for determining financing terms (e.g., terms for a cash advance, loan, etc.) for financing a purchase by the buyer 104. In some embodiments, the financing module 122 is configured to determine whether the buyer 104 qualifies for receiving a financing offer, e.g., a cash advance to purchase a product or service from the merchant 102. To determine whether a buyer is qualified, the financing module 122 evaluates various factors associated with the buyer 104. Some of the factors may include, for example, evaluating the requested purchase amount (i.e., the price of the product for which financing is requested) and the financial transactions conducted by the buyer through the payment processing system 112. For example, if the buyer 104 has a merchant account with the payment processing system 112, the financing module 122 evaluates the buyer's 104 financial transaction history conducted through the payment processing system 112 as a merchant (e.g., payments received).

In some embodiments, the financing module 122 can determine whether a buyer is eligible for a financing offer, the amount of the financing approved for purchase of the product, a fee for the financing (e.g., a percentage of the amount financed or a fixed fee), and a rate of repayment for the financing and the fee (e.g., fixed payments or a portion to be deducted from financial transactions, credit card, bank account, etc.). These determinations can be made, for example, by applying various machine learning techniques such as ensemble learning methods.

In some embodiments, the financing module 122 utilizes, for example, a random forest approach to determine whether a buyer 104 qualifies for a financing offer on a purchase. The financing module 122 uses training data for the random forest approach. The training data describes, for various buyers who may be merchants, respective payment history, the respective type of business, the respective gross payment volume (GPV) over a particular time period, the growth of the buyer's GPV over a particular time period (e.g., month over month growth), and whether the buyer is a merchant owning a brick-and-mortar store, and such. For buyers who are not merchants, the financing module 122 uses training data that describes for various buyers, respective payment history, credit history, a respective number of businesses from which the buyer purchased products or services, value of the products or services bought, and such.

In some embodiments, the financing module 122 uses the random forest approach that has been trained using the training data to determine whether factors describing a buyer 104 qualifies the buyer 104 for a financing offer on a purchase. As mentioned, these factors can be, for example, the requested purchase amount, the payment history, buyer's 104 spending behavior, the type of business, and a GPV over a particular time period (e.g., over the past fiscal quarter or year). The financing module 122 can also determine the amount of the financing approved in the financing offer, the fee for the financing offer, and the rate of repayment, using similar techniques. In some embodiments, the financing module 122 can apply normal regression analysis on the buyer's 104 previous financial transactions processed through the payment processing system 112 to make such determinations.

In some embodiments, the financing module 122 determines that the buyer 104 qualifies up to a maximum amount of financing towards a purchase. In some embodiments, if the maximum amount of financing that is approved is less than the requested purchase amount for the buyer 104, the buyer 104 may request an amount of financing that is higher than the amount of financing that the buyer was offered to receive. In such embodiments, the financing module 122 in combination with human feedback, can evaluate the request to determine whether the buyer should receive the requested higher amount of financing. In some embodiments, if the financing module 122 determines that the buyer is eligible for the requested higher amount of financing, the financing module 122 determines adjusted terms and conditions for the higher amount. The adjusted terms and conditions may include, for example, an adjusted fee for the financing amount, an adjusted payment to be deducted or withheld for repayment of the financing, an adjusted repayment period, or the like.

In some embodiments, the financing module 122 determines terms and conditions for the financing offer. The terms and conditions for the offer may include a fee for the financing being offered. In some embodiments, the fee for the financing being offered can be based on a specified percentage, e.g., 14 percent of the financing amount. In some embodiments, the fee for the financing being offered is a fixed fee. For example, a financing offer of $8000 to a buyer 104 may have a fixed $800 fee.

The terms and conditions for the offer may also include details regarding the repayment of the approved financing amount by the buyer 104. In some embodiments, the rate of repayment of the approved financing amount may be specified as a number of level payments charged to a financial payment instrument (e.g., credit cards, debit cards, and such) or a checking account (e.g., an electronic funds transfer from a personal bank account) of the buyer 104 over a period of time. For example, the rate of repayment may be a specified percentage, e.g., 10 percent charged to the credit card or the checking account of the buyer 104 each month over a 10-month time period. In one example, there is no set time period for repayment. In some embodiments, the repayment of the approved financing amount can be dynamic where a specific amount is deducted as repayment on top of every subsequent purchase made by the buyer 104 at the merchant 102 from where the product was purchased using the financing offer. As mentioned, the specific amount is based on the rate of payment for the financing amount specified in the terms and conditions. For example, a level payment or a percentage on top of the transaction, is charged to the financial payment instrument of the buyer 104 every time the buyer 104 conducts a subsequent business transaction with the merchant 102. In other embodiments, the repayment, e.g., a level payment or a percentage, is charged to the financial payment instrument of the buyer 104 every time the buyer 104 conducts a subsequent business transaction with any other merchant that has respective financial transactions processed by the payment service provided through the payment processing system 112.

In some embodiments, the buyer 104 may be a merchant (i.e., have a merchant account with the payment processing system 112 to process payments for goods or services from other buyers) interested in obtaining financing for a purchase. In one embodiment, repayment of the approved financing amount to the buyer can be made through withholding or deducting a portion of the buyer's earnings from future sales at his or her point-of-sale location (i.e., sales conducted through the payment service provided by the payment processing system 112). For example, when the buyer conducts a financial transaction through the payment processing system 112 to receive payment from another buyer, the repayment can be a portion of the amount collected by the buyer from the financial transaction (e.g., 10 percent). Depending on the implementation, the payment processing system 112 can automatically deduct the portion of the amount collected by the buyer on a per-transaction basis, for example, 10 percent is deducted from each financial transaction conducted by the buyer until the amount financed is repaid to the payment processing system 112. In some embodiments, the payment processing system 112 may deduct the portion of the amount collected over several transactions by the buyer, for example, 10 percent from a total amount collected by the buyer for financial transactions conducted over a certain time period (e.g., hourly, daily, weekly, bi-weekly, monthly, or yearly). In some embodiments, there is no set time period for repayment of the amount financed and fee. However, a time period for repayment may be specified in the terms and conditions.

In some embodiments, repayment of the approved financing amount by withholding a portion of the buyer's earnings from future POS transactions can be a variable percentage based on an amount of each transaction collected by the buyer from the POS transaction. For example, when the buyer conducts a financial transaction accepting $100 through the payment processing system 112, the payment processing system 112 can deduct 5 percent of the $100 as repayment. In another example, when the buyer conducts a financial transaction accepting $1000, the payment processing system 112 can deduct 10 percent of the $1000 as repayment. The higher the amount accepted by the buyer in an individual financial transaction, the larger the portion collected as repayment from that individual financial transaction. In some embodiments, the repayment of the approved financing amount by withholding a portion of the buyer's earnings from future POS transactions can be banded. For example, for repayment of an approved financing amount of $5000, the payment processing system 112 can deduct 5 percent from each POS transaction for the first $1000 collected as repayment. Subsequently, the payment service can deduct 2 percent from each POS transaction for the next $1000 collected as repayment and 1 percent from each POS transaction for the remainder of the repayment.

In some embodiments, the financing module 122 transmits the details of the financing offer to the buyer responsive to determining that the buyer 104 is qualified for the financing offer. In various embodiments, the details of the financing offer can be sent to the buyer via the merchant device 110 at the POS location, via a web-based environment, or via electronic communication, e.g., by email or a text message. In one embodiment, the buyer 104 interacts with merchant application 116 running on the merchant device 110 to learn about the details of the financing offer. For example, an interface can be accessible on the merchant device 110 through a secure Uniform Resource Locator (URL). In this example, the merchant 102 can access the URL through a web browser on the merchant device 110 to present to the buyer 104 to make a decision as to the financing offer. Similarly, the merchant application 116 running on the merchant device 110 may generate an interface to present the details of the financing offer to the buyer 104. In some embodiments, the interface allows the buyer to accept or reject the financing offer at the POS location. In another embodiment, the financing module 122 transmits the details of the financing offer directly to the buyer by email or a text message.

The merchant device 110 transmits an acceptance of the financing offer to the financing module 122 and the payment processing system 112 disburses funds to the merchant 102 in the amount specified in the offer. The payment processing system 112 uses the user account information 128, for example, to retrieve financial account information, e.g., a routing number for a checking account, for the merchant 102. In some embodiments, the payment processing system 112 electronically deposits the funds for the financing in the merchant's 102 financial account. The merchant 102 can then immediately access the full funds while the buyer 104 enjoys the benefit of a financing plan.

In one embodiment, before calculating and transmitting a financing offer to the buyer 104, the payment processing system 112 accepts payment for the purchase amount using a payment card 106 of the buyer 104. The financing module 122 may then generate a financing offer and transmit the financing offer to the buyer 104 with a receipt for the payment card purchase. In response to receiving an acceptance of the financing offer, the payment processing system 112 may refund the purchase amount to the buyer (e.g., process a refund to the payment card 106 of the buyer 104, deposit the refund in a financial account associated with the buyer 104, or the like) and accept repayment from the buyer as described elsewhere herein.

Figure 2:
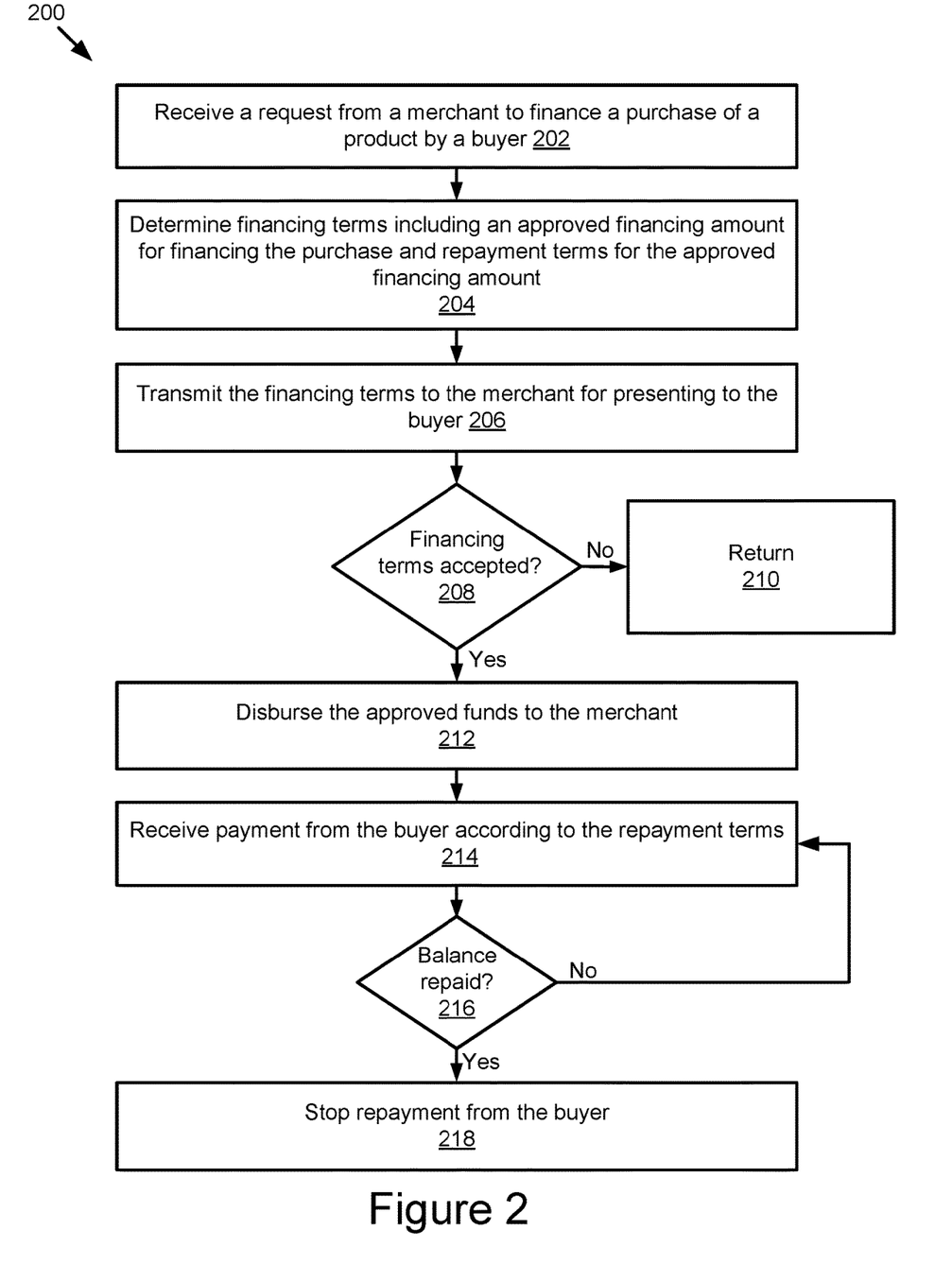
FIG. 2 is a flow diagram of an example process for financing a purchase made by buyers.
Figure 3:
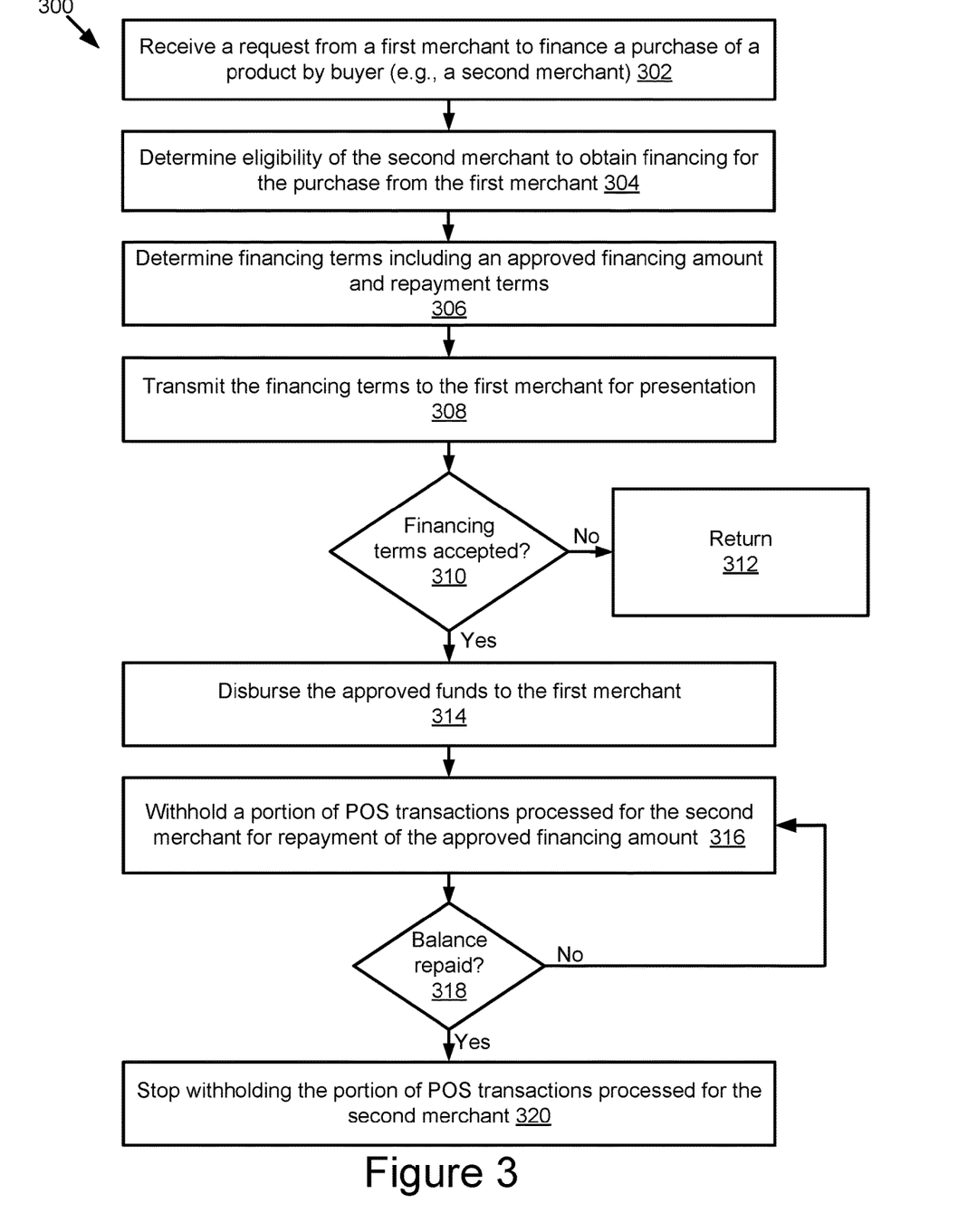
FIG. 3 is a flow diagram of another example process for financing a purchase made by buyers.

The processes described in FIGS. 2 and 3 are each illustrated as a collection of blocks in logical flow diagrams, which represent a sequence of operations, some or all of which can be implemented in hardware, software, or a combination thereof. The order in which the blocks are described should not be construed as a limitation. Any number of the described blocks can be combined in any order and/or performed in parallel to implement the processes, or alternative processes, and not all of the blocks need be executed. For ease of description, the processes are described with reference to the environments, architectures and systems described in the examples herein, although the processes may be implemented in a wide variety of other environments, architectures and systems.

FIG. 2 is a flow diagram of an example process 200 for financing a purchase made by a buyer at a POS location of a merchant 102. At 202, the payment processing system 112 receives a request from a merchant 102 to finance a purchase of a product by a buyer 104. For example, the request can be transmitted using a mobile POS terminal (e.g., merchant device 110) associated with the merchant 102. In one embodiment, the payment processing system 112 receives payment instrument (e.g., credit card, debit card, checking account, etc.) information via the mobile POS terminal and associates the request to finance the purchase (and any subsequent financing offer) with the payment instrument provided by the buyer. Additionally, the payment instrument information may be used to identify the buyer (e.g., during future transactions with the merchant 102 or other merchants using the payment processing system 112 to process payments). In other embodiments, other information (e.g., phone number, email address, etc.) can be used to identify the buyer.

At 204, the financing module 122 determines financing terms including an approved financing amount for financing the purchase and repayment terms for the approved financing amount. In some embodiments, the financing terms include a fee for the financing (e.g., a percentage of the amount financed or a fixed fee). The repayment terms may include a rate of repayment for the amount financed and the fee (e.g., a number of level payments deducted from a credit card or bank account of the buyer or a portion of POS transactions conducted by the buyer as described above). The financing module 122 can make these determinations, for example, by applying various machine learning techniques, such as ensemble learning methods.

In some embodiments, determining financing terms includes determining eligibility of the buyer for financing. For example, the financing module 122 determines eligibility of the buyer to obtain financing based, in part, on evaluating the requested purchase amount and the financial transaction history of the buyer processed by the payment processing system 112. In other embodiments, the financing module 122 may determine eligibility of the buyer based on the type of payment instrument (e.g., debit card, credit card, or the like) presented to the merchant by the buyer. Additionally, the financing module 122 may determine different financing terms based on the type of payment instrument presented to the merchant by the buyer. For example, the fees associated with financing the purchase may be different for financing that is paid back with a credit card than for financing that is paid back with a debit card.

At 206, the financing module 122 transmits the financing terms to the merchant 102 for presenting to the buyer 104. In various embodiments, the financing module 122 can transmit the financing terms to the merchant device 110 at the POS location, to the merchant 102 via a web-based environment, or to the merchant 102 through electronic communication, e.g., by email or a text message. At 208, the financing module 122 determines whether the buyer 104 has accepted the financing terms. If the financing terms are not accepted, at 210, the financing module 122 returns to the beginning of the process and awaits another request for financing. In some embodiments, as described above, the buyer 104 may request modified financing terms (e.g., a request for a financing amount that is higher than that included in the original financing terms). In response to the request for modified financing terms, the financing module 122 determines whether the buyer 104 qualifies for the modified financing terms and presents the modified financing terms to the buyer 104.

If the buyer 104 accepts the financing terms, at 212, the financing module 122 disburses the approved funds to the merchant 102. In some embodiments, as described above, the financing module 122 electronically deposits the funds in a financial account associated with the merchant 102. The merchant 102 can then immediately access the full funds while the buyer 104 enjoys the benefit of a financing plan.

At 214, the financing module 122 receives payment from the buyer 104 according to the repayment terms. As described in more detail above, the payment processing system 112 may receive repayment form the buyer by charging a number of level payments to a payment card or debiting a bank account of the buyer. Similarly, the payment processing system 112 may charge the buyer an additional percentage or level payment in addition to future payments processed by the payment processing system 112 for the merchant or any other merchants that use the payment processing system 112 to process payments.

At 216, the financing module 122 determines whether the balance remaining for the amount financed, including any fee, is repaid. If the balance is not repaid, the payment processing system 112 continues to collect repayment. If the balance is repaid, at 218, the payment processing system stops repayment from the buyer 104.

FIG. 3 is a flow diagram of another example process 300 for financing a purchase made by buyers. In the example of FIG. 3, the buyer 104 has a merchant account with the payment processing system 112. At 302, the payment processing system 112 receives a request from a first merchant (i.e., merchant 102) to finance a purchase from a buyer 104 (i.e., a second merchant). For example, the request can be transmitted using a mobile POS terminal (e.g., merchant device 110) associated with the first merchant 102. In one embodiment, the payment processing system 112 receives payment instrument (e.g., credit card, debit card, checking account, etc.) information via the mobile POS terminal and associates the request to finance the purchase (and any subsequent financing offer) with the payment instrument provided by the second merchant. Additionally, the payment instrument information may be used to identify the second merchant (e.g., during future transactions with the merchant 102 or other merchants using the payment processing system 112 to process payments). In other embodiments, other information (e.g., phone number, email address, etc.) can be used, in addition to or in place of the payment instrument information, to identify the second merchant.

At 304, the financing module 122 determines eligibility of the second merchant to obtain financing for the purchase from the first merchant. As described above, the financing module 122 determines eligibility of the second merchant to obtain financing based, in part, on evaluating the requested purchase amount and the financial transaction history of the second merchant processed by the payment processing system 112.

At 306, the financing module 122 determines financing terms including an approved financing amount and repayment terms. In some embodiments, the financing module 122 determines financing terms including the approved financing amount, a fee, and the rate of repayment of the amount financed and any fees, etc. In some embodiments, the financing module 122 can apply normal regression analysis on the previous financial transactions processed for the second merchant through the payment processing system 112 to make such determinations.

At 308, the financing module 122 transmits the financing terms to the first merchant 102 for presenting to the second merchant (i.e., buyer 104). In various embodiments, the financing module 122 can transmit the financing terms to the merchant device 110 at the POS location, to the first merchant 102 via a web-based environment, or to the first merchant 102 through electronic communication, e.g., by email or a text message. At 310, the financing module 122 determines whether the second merchant (i.e., buyer 104) has accepted the financing terms. If the financing terms are not accepted, at 312, the financing module 122 returns to the beginning of the process and awaits another request for financing. In some embodiments, as described above, the second merchant may request modified financing terms (e.g., a request for a financing amount that is higher than that included in the financing terms). In response to the request for modified financing terms, the financing module 122 determines whether the second merchant qualifies for the modified financing terms and presents the modified financing terms to the buyer 104.

If the second merchant accepts the financing terms, at 314, the financing module 122 disburses the approved financing funds to the first merchant 102. In some embodiments, as described above, the financing module 122 electronically deposits the funds in a financial account associated with the first merchant 102. The first merchant 102 can then immediately access the full funds while the second merchant (i.e., buyer 104) enjoys the benefit of a financing plan.

At 316, the payment processing system 112 withholds a portion of future sales transactions processed for the second merchant (i.e., buyer 104) for repayment of the approved financing amount. As described above, the portion withheld can be a variable percentage based on an amount of each transaction collected by the merchant in the POS transaction.

At 318, the financing module 122 determines whether the balance remaining for the financing, including any financing fee, is repaid. If the balance is not repaid, the payment processing system 112 continues to collect repayment at 316. If the balance is repaid, at 320, the payment processing system 112 stops collecting repayment from transactions processed for the second merchant.

Figure 4:
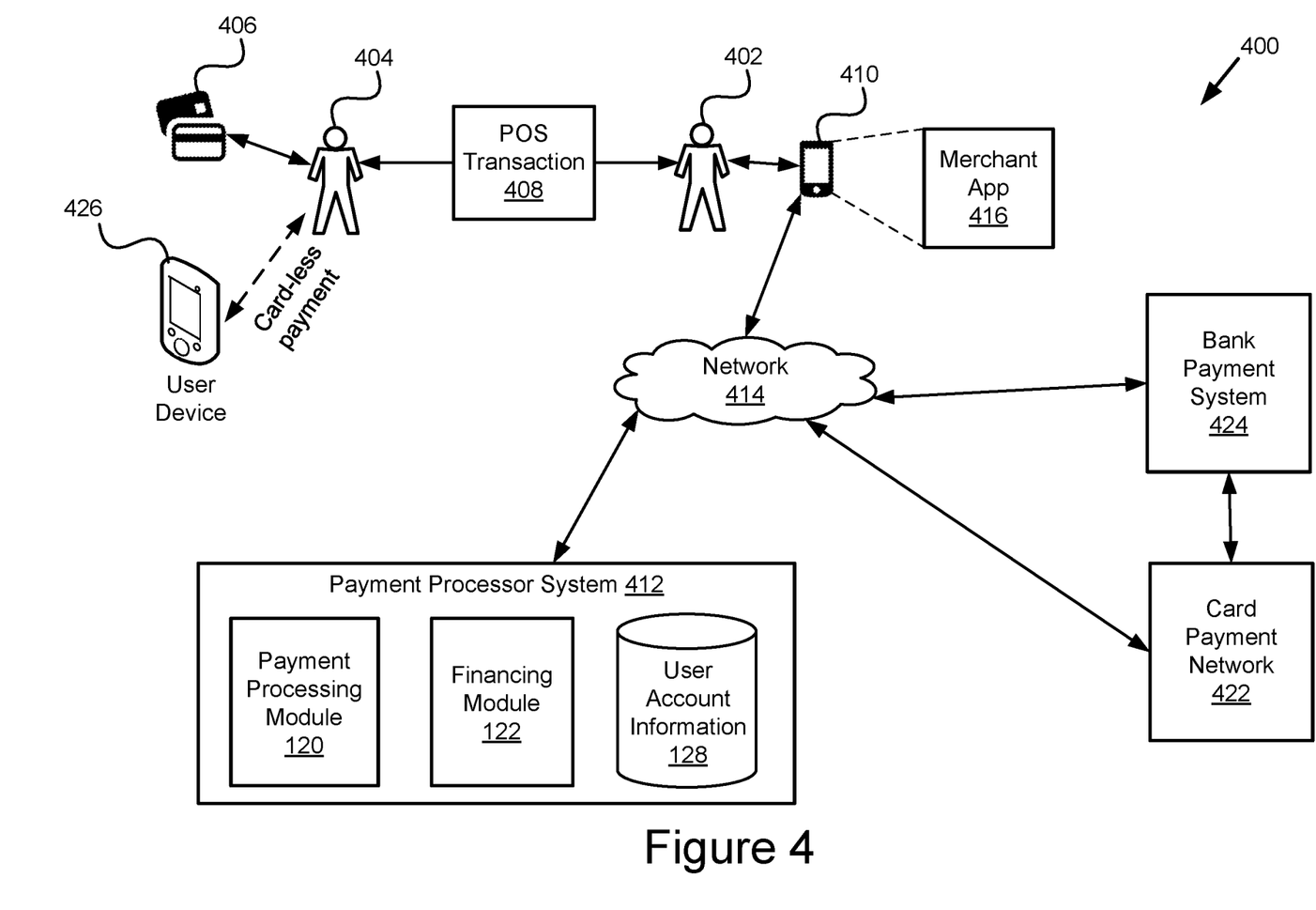
FIG. 4 illustrates an example architecture of a customer financing system for financing a purchase made by buyers.

FIG. 4 illustrates an example architecture of a customer financing system 400 for financing a purchase made by buyers 104. As used in this specification, a financial transaction is a transaction that is conducted between a buyer 404 and a merchant 402 at a point-of-sale. In the example of FIG. 4, a buyer 404 may use any of a variety of payment cards 406 when participating in a POS transaction 408 with a merchant 402. For example, a buyer 404 may typically have payment cards 406 such as credit cards, debit cards, prepaid cards, gift cards, and the like, that the buyer 404 may use for conducting POS transaction 408. In some embodiments, the payment cards 406 may include one or more magnetic stripes for providing payment card and buyer information when swiped in a card reader. In other embodiments, other types of payment cards 406 may be used, for example smart cards having a built-in integrated circuit including a memory chip, a radio frequency identification tag, and the like.

The customer financing system 400 in the example of FIG. 4 illustrates a merchant device 410 associated with the merchant 402 that participates in the payment service provided by the service provider of the payment processing system 412. As discussed elsewhere herein, the merchant device 410 may be a computing device (e.g., a mobile computing device) able to communicate with the payment processing system 412, and with various other computing devices, through any suitable communication protocols, interfaces, and networks, including network 414. Further, the merchant device 410 may be any appropriate device operable to send and receive requests, messages, or other types of information over the network 414. Additionally, while only a single merchant device 410 is illustrated in the example of FIG. 4, there may be additional merchant devices depending on the number of merchants participating in the payment service.

Each merchant device 410 may include an instance of a merchant application 416 executed on the merchant device. The merchant application 416 may provide POS functionality to enable the merchant 402 to accept payments at a POS location using the merchant device 410. In some types of businesses, the POS location may correspond to a store or other place of business of the merchant 402, and thus, may be a fixed location that typically does not change on a day-to-day basis. In other types of businesses, however, the POS location may change from time to time, such as in the case that the merchant 402 operates a food truck, is a street vendor, a cab driver, or has an otherwise mobile business, e.g., in the case of merchants who sell items at buyers' homes, buyers' places of business, and so forth.

Accordingly, the merchant 402 and the buyer 404 may conduct a POS transaction 408 by which the buyer 404 acquires an item or service from the merchant 402 at a POS location. The merchant application 416 on the merchant device 410 may send transaction information to the payment processing system 412, for example, as the transaction is being conducted at the POS location. In some embodiments, such as if a particular merchant device 410 is not connected to the network 414 and is therefore processing transactions offline, the transaction information may be sent in a batch at a subsequent point in time or using other suitable techniques. In some embodiments, the transaction information may be sent via SMS, MMS, or a voice call over network 414 or various other networks.

The transaction information may include information regarding the time, place, and the amount of each respective transaction, information related to the item acquired, payment card information, as well as additional information, such as buyer information. For instance, the transaction information can include data stored in the payment card 406, e.g., magnetic stripe or integrated circuit data (cardholder name, card number, and other card information). In addition, when completing the transaction a buyer may sometimes provide a receipt email address for receiving a receipt through email. Other examples of transaction information that can be captured include detailed item information, e.g., an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant, e.g., a merchant identifier, a merchant category code (MCC), any type of data that is received upon a buyer's authentication into a social network, if any, and various other types of information.

To accept electronic payments for POS transactions, the merchant 402 typically creates a merchant account on the payment processing system 412 by providing information describing the merchant including, for example, merchant name, and contact information (e.g., telephone numbers, the merchant's address, and one or more financial accounts to which funds collected from buyers will be deposited). This merchant information can be securely stored by the service provider, for example, as user account information 128 in a secure database. Further, the merchant information may include a merchant profile created for each merchant. The merchant profile may include information about the merchant 402 and transaction information associated with transactions conducted by the merchant.

The payment processing system 412 enables a payment service provider to provide a payment service in which merchants 402 are able to conduct POS transactions 408 with a plurality of buyers 404, such as for selling services and/or products to the buyers 404. The payment processing system 412 may include one or more servers that are configured to process secure electronic financial transactions, for example, payment during a POS transaction 408, by communicating with the merchant device 410, card payment networks 422, and bank or other financial institution payment systems 424. The payment processing system 412 includes a payment processing module 120 that receives transaction information for processing payments made through the merchant application 416. For example, the payment processing module 120 may receive transaction information, such as an amount of the transaction, and may verify that a particular payment card 406 can be used to pay for the transaction, such as by contacting a card clearinghouse of a card payment network 422. Furthermore, in some examples, the payment processing module 120 may redirect payment information for transactions to be made using payment cards 406 to a bank payment system 424, or a payment system for some other financial institution. In other embodiments, the merchant device 410 may communicate directly with an appropriate card payment network 422 or bank payment system 424 for approving or denying a transaction using a particular payment card 406 for a POS transaction 408. In some embodiments, the payment processing system 412 may provide financing (e.g., a cash advance) for the buyer 404 to purchase an item or service.

As introduced above, the payment processing system 412 may be configured to communicate with one or more systems of a card payment network 422 (e.g., MasterCard®, VISA®, or the like) over the network 414 to conduct financial transactions electronically. The payment processing system 412 may also communicate with one or more bank payment systems 424 of one or more banks, or other financial institutions, over the network 414. For example, the payment processing system 412 may communicate with an acquiring bank, a payment card issuing bank, and/or a bank maintaining buyer accounts for electronic payments.

A payment card acquiring bank may be a registered member of a card association (e.g., Visa®, MasterCard®, or the like), and may be part of a card payment network 422. A payment card issuing bank may issue payment cards 406 to buyers 404, and may pay acquiring banks for purchases made by cardholders to which the issuing bank has issued a payment card 406. Accordingly, in some embodiments, the systems of an acquiring bank may be included in the card payment network 422 and may communicate with systems of a payment card issuing bank to obtain payment. Further, in some embodiments, bank payment systems 424 may include systems associated with debit card issuing institutions, in which case, the systems of the debit card issuing institution may receive communications regarding a transaction in which the buyer uses a debit card instead of a credit card. Additionally, there may be systems of other financial institutions involved in some types of transactions or in alternative system architectures, and thus, the foregoing are merely several examples.

The payment processing system 412 includes a payment processing module 120, a financing module 122, and a user account information 128 for providing financing offers to buyers 404 for purchasing from a merchant 402 as described elsewhere herein.

The network 414 can be a conventional type, wired or wireless, and may have numerous different configurations including a star configuration, token ring configuration, or other configurations. Furthermore, the network 414 may include a local area network (LAN), a wide area network (WAN) (e.g., the internet), and/or other interconnected data paths across which multiple devices may communicate. In some embodiments, the network 414 may be a peer-to-peer network. The network 414 may also be coupled with or include portions of a telecommunications network for sending data using a variety of different communication protocols. In some embodiments, the network 414 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 4 illustrates one network 414 coupled to the merchant device, payment processing system 412, card payment network 422, and bank 424, in practice one or more networks 414 can connect these entities.

Figure 5:
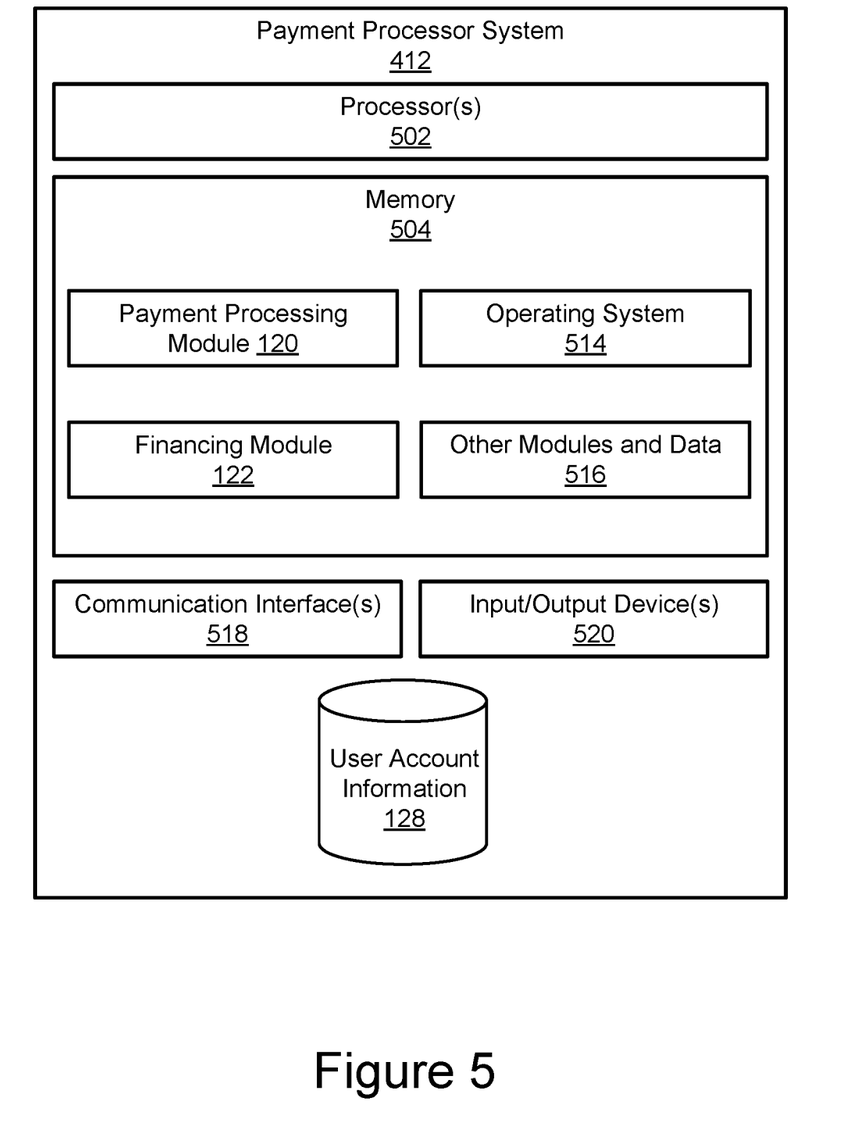
FIG. 5 is a block diagram illustrating select components of an example payment processing system according to some embodiments.

FIG. 5 is a block diagram illustrating select components of an example payment processing system 412 according to some embodiments. The payment processing system 412 may be any suitable type of computing device capable of sending communications and performing the functions according to the techniques described herein and may be operated by a service provider that provides the payment service. For instance, in the case of a server providing the payment processing system 412, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the examples herein illustrate the components and data of the payment processing system 412 as being present in a single location, these components and data may alternatively be distributed across different computing devices and different locations. Consequently, the functions may be implemented by one or more computing devices, with the various functionality described above distributed in various ways across the different computing devices, to collectively implement the payment processing system 412. Multiple payment processing systems 412 may be located together or separately, and organized, for example, as virtual servers, server banks and/or server farms. The described functionality may be provided by the servers of a single entity or enterprise, or may be provided by the servers and/or services of multiple different buyers or enterprises.

In the example of FIG. 5, the payment processing system 412 includes one or more processors 502, one or more memory devices 504, one or more communication interfaces 518, and one or more input/output devices 520. Additionally, the payment processing system 412 may include data stores, such as user account information 128. These components may be similar to those described above with reference to FIG. 4 and elsewhere herein.

The memory 504 may be used to store and maintain any number of functional components or modules that are executable by the processor 502. In some embodiments, these functional components comprise instructions or programs that are executable by the processor 502 and that, when executed, implement operational logic for performing the actions and services attributed above to the payment processing system 412. Functional components of the payment processing system 412 stored in the memory 504 may include the payment processing module 120 and financing module 122. These components may be similar to those describe above with reference to FIG. 4 and elsewhere herein. Additional functional components may include an operating system 514 for controlling and managing various functions of the payment processing system and for enabling basic user interactions with the payment processing system 412. In addition, the memory 504 may store data used for performing the operations described herein. Further, the payment processing system 412 may include many other logical, programmatic and physical components, of which those described above are merely examples that are related to the discussion herein.

Figure 6:
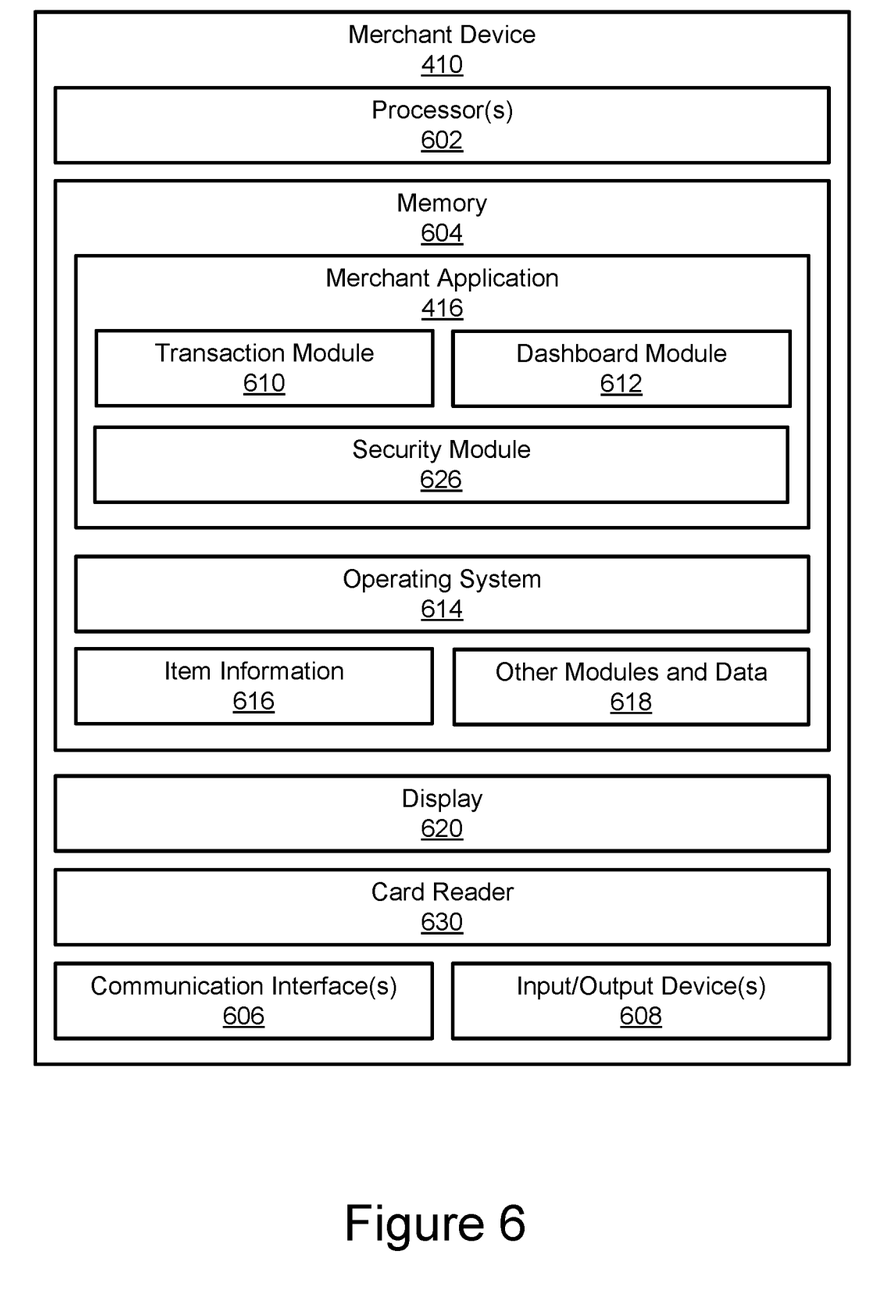
FIG. 6 is a block diagram illustrating select components of an example merchant device according to some embodiments.

FIG. 6 is a block diagram illustrating select components of an example merchant device 410 according to some embodiments. The merchant device 410 may be any suitable type of computing device, for example, portable, semi-portable, semi-stationary, or stationary. Some examples of the merchant device 410 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body mounted computing devices; augmented reality devices; or other computing devices capable of sending communications and performing the functions according to the techniques described herein.

In the example of FIG. 6, the merchant device 410 includes at least one processor 602, a memory 604, one or more communication interfaces 606, and one or more input/output (I/O) devices 608. Each processor 602 may itself comprise one or more processors or processing cores. For example, the processor 602 can be implemented as one or more microprocessors, microcomputers, microcontrollers, digital signal processors, central processing units, state machines, logic circuitries, and/or any devices that manipulate signals based on operational instructions. In some embodiments, the processor 602 may be one or more hardware processors and/or logic circuits of any suitable type specifically programmed or configured to execute the algorithms and processes described herein by performing various input/output, logical, and/or mathematical operations. The processor 602 can be configured to fetch and execute computer-readable processor-executable instructions stored in the memory 604.

Depending on the configuration of the merchant device 410, the memory 604 may be an example of tangible, non-transitory computer storage media and may include volatile and nonvolatile memory and/or removable and non-removable media implemented in any type of technology for storage of information such as computer-readable processor-executable instructions, data structures, program modules or other data. The memory 604 may include, but is not limited to, RAM, ROM, EEPROM, flash memory, solid-state storage, magnetic disk storage, optical storage, and/or other computer-readable media technology. Further, in some cases, the merchant device 410 may access external storage, such as RAID storage systems, storage arrays, network attached storage, storage area networks, cloud storage, or any other medium that can be used to store information and that can be accessed by the processor 602 directly or through another computing device or network. Accordingly, the memory 604 may be computer storage media able to store instructions, modules or components that may be executed by the processor 602.

The memory 604 may be used to store and maintain any number of functional components or modules that are executable by the processor 602. In some embodiments, these functional components comprise instructions or programs that are executable by the processor 602 and that, when executed, implement operational logic for performing the actions and services attributed above to the merchant device 410. Functional components of the merchant device 410 stored in the memory 604 may include the merchant application 416. In this example, the merchant application 416 includes a transaction module 610, a dashboard module 612, and a security module 626. The transaction module 610, for example, presents an interface, such as a payment interface to enable the merchant to conduct transactions, receive payments, and so forth, as well as for communicating with the payment processing system 412 for processing payments and sending transaction information. The dashboard module 612 enables the merchant to manage the merchant's account, the merchant profile, merchant preferences, view saved or new pricing information, and the like. The security module 626 may, as described herein, enable the merchant application 416 to encrypt and decrypt transaction information communicated between the merchant device 410 and other system components. Additional functional components may include an operating system 614 for controlling and managing various functions of the merchant device 410 and for enabling basic user interactions with the merchant device 410.

In addition, the memory 604 may also store data, data structures and the like, that are used by the functional components. For example, data stored by the memory 604 may include item information 616 that includes information about the items offered by the merchant, which may include a list of items currently available from the merchant, images of the items, descriptions of the items, prices of the items, and so forth. For instance, when the merchant 402 is setting up the merchant application 416 to accept payments for particular items offered by the merchant 402, the merchant may enter the item information 616 for the particular items. Depending on the type of the merchant device 410, the memory 604 may also optionally include other functional components and data, such as other modules and data 618, which may include programs, drivers, etc., and the data used or generated by the functional components. Further, the merchant device 410 may include many other logical, programmatic and physical components, of which those described are merely examples that are related to the discussion herein.

The communication interface(s) 606 may include one or more interfaces and hardware components for enabling communication with various other devices, such as over the network(s) 414 or directly. For example, communication interface(s) 606 may enable communication through one or more of the internet, cable networks, wireless networks (e.g., Wi-Fi) and wired networks, as well as close-range communications such as Bluetooth®, Bluetooth® low energy, and the like, as additionally enumerated elsewhere herein.

In another embodiment, the communication interface(s) 606 may include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 606 also provides other conventional connections to the network 414 for distribution of files and/or media objects using standard network protocols such as TCP/IP, HTTP, HTTPS and SMTP as will be understood.

The merchant device 410 may further include a display 620, which may employ any suitable display technology. For example, the display 620 may be a liquid crystal display, a plasma display, a light emitting diode display, an OLED (organic light-emitting diode) display, an electronic paper display, or any other suitable type of display able to present digital content thereon. In some embodiments, the display 620 may have a touch sensor associated with the display 620 to provide a touchscreen display configured to receive touch inputs for enabling interaction with a graphical user interface presented on the display 620. Accordingly, embodiments described herein are not limited to any particular display technology.

The merchant device 410 may further include one or more I/O devices 608. The I/O devices 608 may include speakers, a microphone, a camera, and various user controls (e.g., buttons, a joystick, a keyboard, a keypad, etc.), a haptic output device, and so forth.

In addition, the merchant device 410 may include or may be connectable to a payment card reader 630. In some embodiments, the payment card reader 630 may plug in to a port in the merchant device, such as a microphone/headphone port. In other embodiments, the mobile device interface may include other physical connectors, standardized or proprietary, for coupling the payment card reader 630 with the merchant device 410. In yet other embodiments, the payment card reader 630 may use a low power wireless communication interface (e.g., Bluetooth, Bluetooth Low Energy, Zigbee, or the like) to communicatively couple the payment card reader 630 with the merchant device 410 without a physical connection. The payment card reader 630 may include a card interface for reading a magnetic stripe or an integrated circuit of a payment card 406, and further may include encryption hardware and/or logic for encrypting the information read from the payment card 406. Alternatively, numerous other types of payment card readers 630 may be employed with the merchant devices 410 herein, depending on the type and configuration of the merchant device 410.

As used here, the term "payment card" refers to a payment mechanism which includes a debit card, a conventional credit card, "smartcards" that have embedded integrated circuit chips (e.g., Europay-MasterCard-Visa (EMV) cards), or any wallet-size card which functions as a combination of any of these payment mechanisms. In some embodiments, payment card may also include a virtual payment card stored on a device such as a smart phone or other device and transmittable, for example, via near field communication or other suitable means.

Other components included in the merchant device 410 may include various types of sensors (not shown), which may include a GPS device, an accelerometer, gyroscope, compass, proximity sensor, and the like. Additionally, the merchant device 410 may include various other components that are not shown, examples of which include removable storage, a power source, such as a battery and power control unit, and so forth.

A customer financing system using a payment card reader has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the techniques may be implemented using any type of computing system that can receive data and commands, and present information as part of any peripheral device providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the techniques to the precise form disclosed. Many modifications and variations are possible in light of the above teaching. It is intended that the scope of the embodiments be limited not by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats. Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, known to those of ordinary skill in the art of computer programming. Additionally, the techniques are in no way limited to implementation in any specific programming language, or for any specific operating system or environment. Accordingly, the specification is intended to be illustrative, but not limiting, of the scope of the claims, which are set forth below.

What is claimed is:

1. A non-transitory computer-readable medium storing instructions executable by one or more processors associated with a financing service provider system to cause the financing service provider system to perform operations comprising:
   receiving, by the financing service provider system, via a payment processing system and from a plurality of point-of-sale (POS) terminals associated with a plurality of merchants, respectively, transaction information of a plurality of transactions for purchases of items by a plurality of customers from the plurality of merchants, respectively;
   training, by the financing service provider system, a machine-learning model using, as training data, at least the transaction information of the plurality of purchases of items by the plurality of customers, the transaction information including payment histories of the customers for the purchases and a value of the purchases made by the customers, to train the machine-learning model to determine, at least in part: (i) eligibility to obtain financing for transactions, and (ii) customized financing terms;
   receiving, by the financing service provider system, and via a user interface associated with a merchant and presented by a device, a request to finance a transaction between a customer and the merchant, wherein the device is configured to run an application configured to receive an input indicating a product or service for the transaction and facilitate a transfer of funds for the transaction;
   using, by the financing service provider system, the machine-learning model and transaction data associated with the transaction to determine, at least in part, eligibility of the customer to obtain financing for the transaction;
   based at least on determining the eligibility of the customer, using, by the financing service provider system, the machine-learning model and the transaction data to determine an offer for financing including financing terms customized for the customer, the financing terms including an amount to be financed and repayment terms for the amount, the repayment terms including repayment of the amount over two or more partial payments, wherein the financing is associated with a fee to be paid to the financing service provider system, wherein the fee is associated with at least one partial payment of the two or more partial payments, and wherein each of the two or more partial payments are defined in association with the offer;
   receiving, by the financing service provider system, and via an interaction with a user interface associated with the customer, an indication of an acceptance by the customer of the offer including the financing terms;
   transmitting, by the financing service provider system, funds to the merchant prior to the customer paying each of the two or more partial payments; and
   receiving, by the financing service provider system, from at least one payment option of the customer and according to the repayment terms, a portion of the amount that corresponds to a first partial payment of the two or more partial payments.

2. The non-transitory computer-readable medium of claim 1, wherein:
   the merchant is a first merchant having a first merchant account to process payments using the financing service provider system;
   the customer is a second merchant having a second merchant account to process payments using the financing service provider system; and
   the repayment terms include withholding a portion of each transaction processed via a mobile device of the second merchant, including withholding a percentage of each transaction processed via the mobile device of the second merchant for repayment of the financing and the fee.

3. The non-transitory computer-readable medium of claim 1, wherein:
   the device from which the request to finance the transaction is receive is a POS terminal associated with the merchant; and
   the POS terminal associated with the merchant is configured to present the user interface associated with the merchant.

4. The non-transitory computer-readable medium of claim 1, wherein:
   the request to finance the transaction is received via a website associated with the merchant; and
   the website is configured to present the user interface associated with the merchant.

5. The non-transitory computer-readable medium of claim 1, the operations further comprising:
   charging a payment instrument of the customer for an amount corresponding to the transaction, wherein the offer including the financing terms is transmitted to the customer with a receipt associated with charging the payment instrument; and
   in response to receiving the indication of the acceptance of the offer including the financing terms from the customer, refunding, to the payment instrument of the customer, the amount corresponding to the transaction.

6. A computer-implemented method comprising:
   receiving, by a financing service provider system, via a payment processing system and from a plurality of point-of-sale (POS) terminals associated with a plurality of merchants, respectively, transaction information of a plurality of transactions for purchases of items by a plurality of customers from the plurality of merchants, respectively;
   training, by the financing service provider system, a machine-learning model using, as training data, at least the transaction information of the plurality of purchases of items by the plurality of customers, the transaction information including payment histories of the customers for the purchases and a value of the purchases made by the customers, to train the machine-learning model to determine, at least in part: (i) eligibility to obtain financing for transactions, and (ii) customized financing terms;

receiving, by the financing service provider system, and via a user interface associated with a merchant and presented by a device, a request to finance a transaction between a customer and the merchant, wherein the device is configured to run an application configured to receive an input indicating a product or service for the transaction and facilitate a transfer of funds for the transaction;

using, by the financing service provider system, the machine-learning model and transaction data associated with the transaction to determine, at least in part: (i) eligibility of the customer to obtain financing for the transaction;

based at least on determining the eligibility of the customer, using, by the financing service provider system, the machine-learning model and the transaction data to determine an offer for financing including financing terms customized for the customer, the financing terms including an amount to be financed and repayment terms for the amount, the repayment terms including repayment of the amount over two or more partial payments, wherein the financing is associated with a fee to be paid to the financing service provider system, wherein the fee is associated with at least one partial payment of the two or more partial payments, and wherein each of the two or more partial payments are defined in association with the offer;

receiving, by the financing service provider system and via an interaction with a user interface associated with the customer, an indication of an acceptance by the customer of the offer including the financing terms;

transmitting, by the financing service provider system, funds to the merchant prior to the customer paying each of the two or more partial payments; and receiving, by the financing service provider system, from at least one payment option of the customer and according to the repayment terms, a portion of the amount that corresponds to a first partial payment of the two or more partial payments.

7. The computer-implemented method of claim 6, wherein:

the merchant is a first merchant having a first merchant account to process payments using the financing service provider system via a first POS terminal corresponding to the device; and the customer is a second merchant having a second merchant account to process payments using the financing service provider system via a second POS terminal.

8. The computer-implemented method of claim 7, wherein the eligibility of the customer is further determined based on a financial history of the customer, the financial history of the customer including an amount collected by the customer as the second merchant from previous financial transactions processed through the financing service provider system.

9. The computer-implemented method of claim 6, wherein:

the merchant is a first merchant having a first merchant account to process payments using the financing service provider system;

the customer is a second merchant having a second merchant account to process payments using the financing service provider system; and the repayment terms include withholding a portion of each transaction processed via a mobile device of the second merchant, including withholding a percentage of each transaction processed via the mobile device of the second merchant for repayment of the financing and the fee.

10. The computer-implemented method of claim 6, wherein transmitting the funds to the merchant is responsive to receiving the indication of acceptance of the offer including the financing terms from the customer via the device.

11. The computer-implemented method of claim 6, wherein:

the request to finance the transaction is received via a website associated with the merchant; and the website is configured to present the user interface associated with the merchant.

12. The computer-implemented method of claim 6, further comprising:

charging a payment instrument of the customer for an amount corresponding to the transaction, wherein the offer including the financing terms is transmitted to the customer with a receipt associated with charging the payment instrument; and in response to receiving the indication of the acceptance of the offer including the financing terms from the customer, refunding, to the payment instrument of the customer, the amount corresponding to the transaction.

13. A financing service provider system comprising:

one or more processors configured by executable instructions that, when executed, cause the financing service provider system to perform operations comprising:

receiving, by the financing service provider system, via a payment processing system and from a plurality of point-of-sale (POS) terminals associated with a plurality of merchants, respectively, transaction information of a plurality of transactions for purchases of items by a plurality of customers from the plurality of merchants, respectively;

training, by the financing service provider system, a machine-learning model using, as training data, at least the transaction information of the plurality of purchases of items by the plurality of customers, the transaction information including payment histories of the customers for the purchases and a value of the purchases made by the customers, to train the machine-learning model to determine, at least in part: (i) eligibility to obtain financing for transactions, and (ii) customized financing terms;

receiving, by the financing service provider system, and via a user interface associated with a merchant and presented by a device, a request to finance a transaction between a customer and the merchant, wherein the device is configured to run an application configured to receive an input indicating a product or service for the transaction and facilitate a transfer of funds for the transaction;

using, by the financing service provider system, the machine-learning model and transaction data associated with the transaction to determine, at least in part, eligibility of the customer to obtain financing for the transaction;

based at least on determining the eligibility of the customer, using, by the financing service provider system, the machine-learning model and the transaction data to determine an offer for the financing including financing terms customized for the customer, the financing terms including an amount to be financed and repayment terms for the amount, the repayment terms including repayment of the amount over two or more partial payments, wherein the financing is associated with a fee to be paid to the financing service provider system, wherein the fee is associated with at least one partial payment of the two or more partial payments, and wherein each of the two or more partial payments are defined in association with the offer;

receiving, by the financing service provider system, and via an interaction with a user interface associated with the customer, an indication of an acceptance by the customer of the offer including the financing terms;

transmitting, by the financing service provider system, funds to the merchant prior to the customer paying each of the two or more partial payments; and receiving, by the financing service provider system, from at least one payment option of the customer and according to the repayment terms, a portion of the amount that corresponds to a first partial payment of the two or more partial payments.

14. The financing service provider system of claim 13, wherein transmitting the funds to the merchant is in response to receiving the indication of acceptance of the offer including the financing terms from the customer via the device.

15. The financing service provider system of claim 13, the operations further comprising:
receiving payment instrument information associated with the transaction data; and
accessing an account of the customer at least partially in response to receiving the payment instrument information.

16. The financing service provider system of claim 13, wherein:

the merchant is a first merchant having a first merchant account to process payments using the financing service provider system via a first POS terminal corresponding to the device; and
the customer is a second merchant having a second merchant account to process payments using the financing service provider system via a second POS terminal.

17. The financing service provider system of claim 13, the operations further comprising transmitting, by the financing service provider system, the offer including the financing terms to a mobile device associated with the customer, wherein the indication of acceptance is received via the interaction with the user interface on the mobile device of the customer.

18. The financing service provider system of claim 13, wherein:
the request to finance the transaction is received via a website associated with the merchant; and
the website is configured to present the user interface associated with the merchant.

19. The financing service provider system of claim 18, wherein receiving, by the financing service provider system, the indication of acceptance of the offer including the financing terms from the customer includes receiving the indication of acceptance via POS terminal associated with the merchant.

20. The financing service provider system of claim 13, the operations further comprising:
charging a payment instrument of the customer for an amount corresponding to the transaction, wherein the offer including the financing terms is transmitted to the customer with a receipt associated with charging the payment instrument; and
in response to receiving the indication of the acceptance of the offer including the financing terms from the customer, refunding, to the payment instrument of the customer, the amount corresponding to the transaction.

* * * * *

UNITED STATES PATENT AND TRADEMARK OFFICE
CERTIFICATE OF CORRECTION

| | | |
|---|---|---|
| PATENT NO. | : 12,131,376 B2 | Page 1 of 1 |
| APPLICATION NO. | : 17/838690 | |
| DATED | : October 29, 2024 | |
| INVENTOR(S) | : Brian Boates et al. | |

It is certified that error appears in the above-identified patent and that said Letters Patent is hereby corrected as shown below:

In the Claims

In Claim 3, Column 20, Lines 31-32:
"the device from which the request to finance the transaction is receive is a POS terminal associated with the"
Should be corrected to:
"the device from which the request to finance the transaction is received is a POS terminal associated with the"

Signed and Sealed this
Fourth Day of March, 2025

Coke Morgan Stewart
*Acting Director of the United States Patent and Trademark Office*